Figure 1:
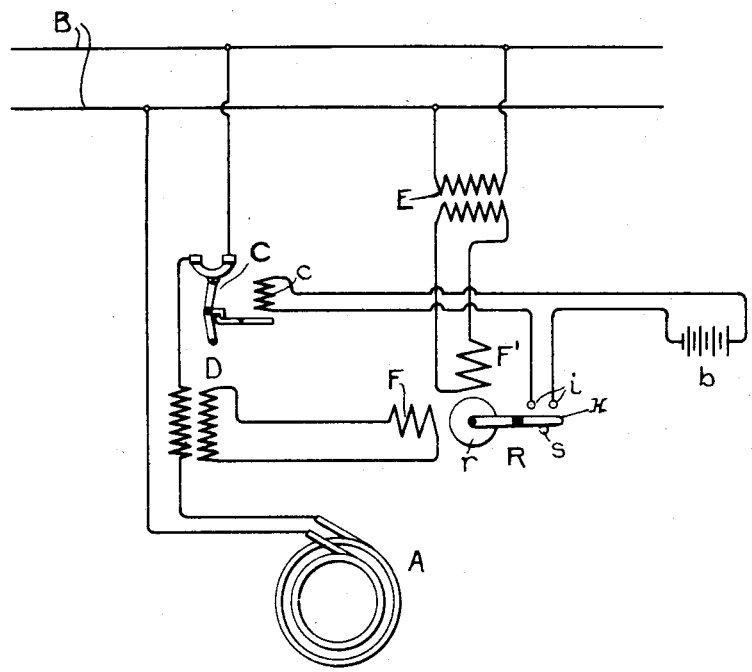

No. 792,101. PATENTED JUNE 13, 1905.
L. WILSON.
MEANS FOR PROTECTION AGAINST REVERSAL OF ENERGY.
APPLICATION FILED NOV. 3, 1904.

Witnesses.
Chathan E. Briggs
Helen Oxford

Inventor:
Leonard Wilson
by Albert G. Davis
Att'y

No. 792,101. Patented June 13, 1905.

UNITED STATES PATENT OFFICE.

LEONARD WILSON, OF PITTSFIELD MASSACHUSETTS, ASSIGNOR TO STANLEY ELECTRIC MANUFACTURING COMPANY, OF PITTSFIELD, MASSACHUSETTS, A CORPORATION OF NEW JERSEY.

MEANS FOR PROTECTION AGAINST REVERSAL OF ENERGY.

SPECIFICATION forming part of Letters Patent No. 792,101, dated June 13, 1905.

Application filed November 3, 1904. Serial No. 231,210.

*To all whom it may concern:*

Be it known that I, LEONARD WILSON, a subject of the King of Great Britain, residing at Pittsfield, county of Berkshire, State of Massachusetts, have invented certain new and useful Improvements in Means for Protection Against Reversal of Energy, of which the following is a specification.

My invention relates to the protection of alternating-current circuits against a reversal of the flow of energy therein; and it consists in an improvement in the arrangement of protective devices disclosed in Letters Patent No. 769,973, issued to me September 13, 1904.

It is frequently desirable to provide an alternating-current circuit with protective devices, so that it will be opened automatically upon a reversal of energy. Such, for instance, is the case in which a number of alternating-current generators are connected in parallel. If the field-circuit of one generator is broken, a reversal of energy will take place in the circuit connecting it to the other generators, and a heavy reverse current will flow, which may result in damage. In order to guard against such reversal of energy, it has been proposed heretofore to employ a differential electromagnetic device supplied from two transformers, one in shunt and the other in series in the circuit to be protected. Normally the currents from the two transformers oppose each other in the protective device; but on a reversal of energy-flow in the circuit the current in the series transformer is reversed relatively to that in the potential-transformer, and the two currents assist each other in operating the device. As pointed out in my former patent above referred to, when a series transformer of the ordinary construction, with an unsaturated core, is employed no sharply-defined point at which the device will operate can be obtained; but, as is also pointed out in the above-mentioned patent, by the use of a series transformer having a core adapted to be saturated by a fraction of the full-load current of the circuit a sharply-defined point for operation may be obtained. The saturation of the core, however, produces a relative phase displacement of the primary and secondary currents of the series transformer, so that instead of being nearly one hundred and eighty degrees out of phase they are little more than ninety degrees out of phase. In protective devices adapted to operate on two currents substantially in phase it is difficult to secure proper operation with a saturated core in the series transformer unless the potential impressed upon the primary of one of the transformers is shifted in phase relative to the other. Thus in my former patent above mentioned I have shown one arrangement in which the potential-transformer is connected in one phase and the series transformer in another phase of the polyphase circuit. For the protection of a single-phase circuit I have shown means for shifting the potential impressed on the potential-transformer.

My present invention consists in a novel arrangement whereby a series transformer with saturated core may be connected in the same phase with the potential-transformer and no phase-shifting devices employed. I accomplish this by employing an electromagnetic device adapted to operate on two out-of-phase currents. In other words, my invention consists in the combination of a series transformer having a saturated core and a potential-transformer of a polyphase electromagnetic device energized from the secondaries of the two transformers.

More specifically stated, my invention consists in the combination with the above transformers of a small polyphase motor normally prevented from rotation, but arranged when its torque is reversed to operate a switch in the circuit to be protected.

My invention will best be understood by reference to the accompanying drawings, in which—

Figure 2:
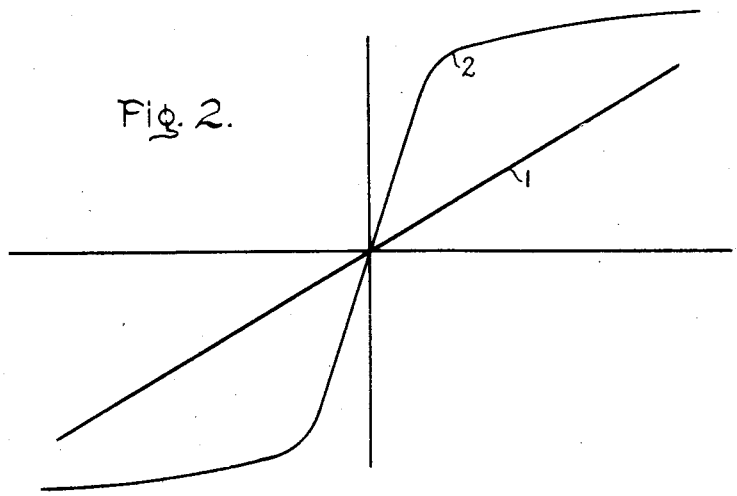

Figure 1 shows diagrammatically an electric circuit provided with protective devices in accordance with my invention, and Fig. 2 is an explanatory diagram.

In the drawings, A represents an alternating-current generator connected, through a switch or circuit-breaker C, to the bus-bars B.

D represents a transformer having its primary in series with the generator-leads.

E represents a transformer having its primary connected in shunt to the bus-bars. The secondaries of the two transformers are connected to the relatively displaced stationary coils F F', respectively, of the relay R, which consists, essentially, of a small induction-motor provided with the short-circuited rotor R.

If the series transformer D is of the ordinary type with unsaturated core, the current in the coil F for different values of current-flow in the generator-circuit will be indicated by the line 1 in Fig. 2, in which the abscissas represent the flow of current in the generator-circuit and the ordinates the current in the coil F. Since the line 1 is substantially a straight line, no clearly-defined point of operation can be obtained. If, however, the transformer D is provided with a core adapted to be saturated by a comparatively small fraction of the full load of the current on the generator, the current in coil F for different values of current in the generator-circuit will be indicated by the line 2 in Fig. 2. It will be seen from this line that a very small variation of current-flow in the generator-circuit on either side of zero will produce a very large variation in current-flow in the coil F. As has been heretofore stated, the saturation of the core of the transformer D produces a phase displacement between the primary and secondary currents—that is, the current in coil F will be little more than ninety degrees out of phase with the current in the coil F' for non-inductive load on the generator; but this phase displacement is precisely what is required for the proper operation of a relay of the type shown.

The short-circuited rotor $r$ is provided with a contact-arm H, which is normally held against the stop $s$ by gravity or other suitable force. The coils F F' are so connected that with normal conditions of the generator-circuit the torque produced in the relay assists in holding the arm H against the stop. If the generator A should fail and energy should flow from the bus-bars to the generator, the current in coil F would be reversed relatively to that in coil F' and the torque in the relay would be reversed. The arm H will consequently be moved away from stop $s$ and engage the contacts $i$. This closes a circuit from the battery $b$ or other source of current through the tripping-coil $c$ of the circuit-breaker C, and the generator is thereby disconnected from the bus-bars.

Instead of using the device R as a relay to close the circuit it is obvious that it may be connected mechanically to trip the circuit-breaker C, as shown in my former patent above referred to.

Other modifications may be made, and accordingly I do not desire to limit myself to the particular construction and arrangement of parts here shown, but aim in the appended claims to cover all modifications which are within the scope of my invention.

What I claim as new, and desire to secure by Letters Patent of the United States, is—

1. In combination with a circuit to be protected, a series transformer in said circuit having a core adapted to be saturated by a fraction of the full-load current, a potential-transformer, a polyphase torque-producing device connected to the secondaries of said transformers, a switch in said circuit, and operative connections between said device and said switch.

2. In combination with a circuit to be protected, a series transformer in said circuit having a core adapted to be saturated by a fraction of the full-load current, a potential-transformer, a polyphase induction-motor having its primary energized from the secondaries of said transformers, means for normally preventing rotation of said motor, and means for opening said circuit upon a reversal of torque in said device.

3. In combination with a circuit to be protected, a series transformer in said circuit having a core adapted to be saturated by a fraction of the full-load current, a potential-transformer, a protective device having two mechanically-displaced windings connected respectively to the secondaries of said transformers and a relatively movable short-circuited member in inductive relation to said windings, means for normally preventing movement of said short-circuited member, a switch in said circuit to be protected, and operative connections between said device and said switch.

4. In combination with a circuit to be protected, a series transformer in said circuit having a core adapted to be saturated by a fraction of the full-load current, a potential-transformer, a protective device having two mechanically-displaced windings connected respectively to the secondaries of said transformers and a relatively movable short-circuited member in inductive relation to said windings, means for normally preventing movement of said short-circuited member, a switch in said circuit to be protected, a tripping-coil for said switch, a contact member carried by said short-circuited member, and contacts in circuit with said tripping-coil adapted to be engaged by said contact member upon a reversal of torque in said device.

In witness whereof I have hereunto set my hand this 31st day of October, 1904.

LEONARD WILSON.

Witnesses:
CHARLES E. DORR,
M. L. WILCOX.